US010652934B2

(12) United States Patent
Toda et al.

(10) Patent No.: US 10,652,934 B2
(45) Date of Patent: May 12, 2020

(54) COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventors: Kozo Toda, Kashiwa (JP); Fumio Mikami, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/122,340

(22) Filed: Sep. 5, 2018

(65) Prior Publication Data

US 2019/0090288 A1 Mar. 21, 2019

(30) Foreign Application Priority Data

Sep. 19, 2017 (JP) .................. 2017-178930
Jun. 26, 2018 (JP) .................. 2018-121328

(51) Int. Cl.
*H04W 76/10* (2018.01)
*H04W 88/06* (2009.01)
*H04W 4/80* (2018.01)
*H04W 84/12* (2009.01)
*H04L 29/08* (2006.01)

(52) U.S. Cl.
CPC .......... *H04W 76/10* (2018.02); *H04W 88/06* (2013.01); *H04L 67/34* (2013.01); *H04W 4/80* (2018.02); *H04W 84/12* (2013.01)

(58) Field of Classification Search
CPC ....... H04W 76/10; H04W 84/12; H04W 4/80; H04W 88/06; H04L 67/34
See application file for complete search history.

(56) References Cited

U.S. PATENT DOCUMENTS

| 6,766,402 | B1 | 7/2004 | Agata | |
|---|---|---|---|---|
| 2004/0038707 | A1* | 2/2004 | Kim | .................. H04L 12/12 455/554.1 |
| 2011/0261797 | A1* | 10/2011 | Yamaguchi | ......... H04W 72/048 370/338 |
| 2017/0085943 | A1* | 3/2017 | Shin | .................. H04N 21/4383 |
| 2018/0136809 | A1* | 5/2018 | Denneler | ............ G06F 3/04817 |

FOREIGN PATENT DOCUMENTS

| JP | 2001-051749 A | 2/2001 |
|---|---|---|
| JP | 2004-206162 A | 7/2004 |
| JP | 2013-012798 A | 1/2013 |
| JP | 2014-060479 A | 4/2014 |
| JP | 2016-197840 A | 11/2016 |

* cited by examiner

*Primary Examiner* — Afshawn M Towfighi
(74) *Attorney, Agent, or Firm* — Canon U.S.A., Inc. IP Division

(57) ABSTRACT

A communication apparatus connectable to a network using a first wireless LAN module includes an interface configured to connect a second wireless LAN module and at least one controller configured to function as a unit that uses the second wireless LAN module for network connection without using the first wireless LAN module for network connection based on a fact that the second wireless LAN module is connected to the interface.

18 Claims, 13 Drawing Sheets

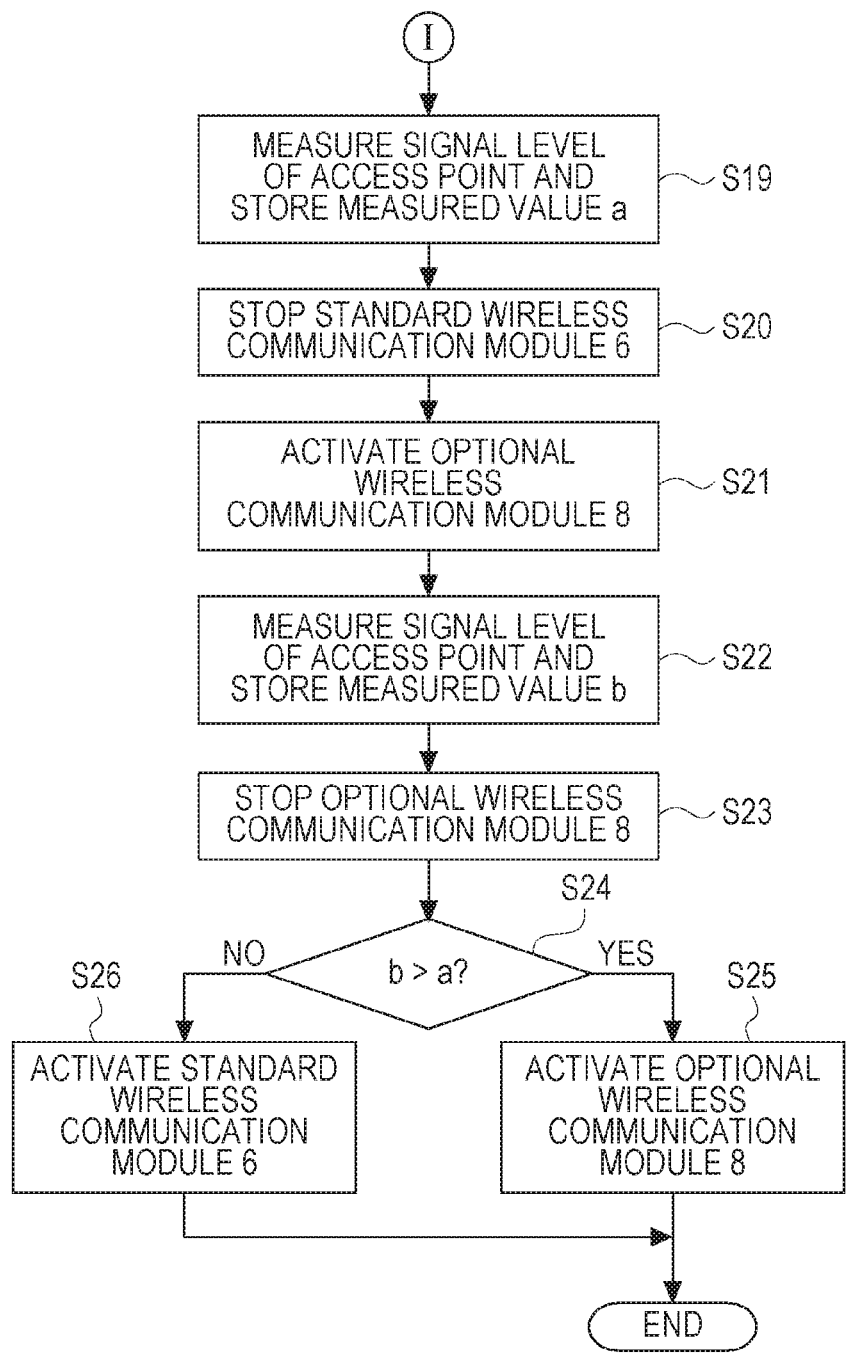

COMMUNICATION APPARATUS, METHOD FOR CONTROLLING THE SAME, AND STORAGE MEDIUM

BACKGROUND

Field of the Disclosure

The present disclosure relates to a communication apparatus, a method for controlling the communication apparatus, and a storage medium.

Description of the Related Art

There are known communication apparatuses in the art to which an optional unit, such as a wireless local area network (LAN) adaptor, can be installed (Japanese Patent Laid-open No. 2001-51749).

In order to use the optional unit as disclosed in Japanese Patent Laid-open No. 2001-51749, an installation operation for using the optional unit is needed. Examples of the installation operation include an operation for installing the optional unit to the apparatus and a setting operation for the apparatus to recognize the optional unit to enable the optional unit. In particular, installing an optional wireless LAN module to an apparatus including a standard wireless LAN module often involves an operation process for removing or disabling the standard wireless LAN module to make the optional wireless LAN module normally operate. The complicated installation operation can increase the work burden on the installation operator, which may cause a work error. As such, what is needed is a mechanism to simplify the installation operation.

SUMMARY

The present disclosure provides a communication apparatus including a standard wireless LAN module, to which an optional wireless LAN module can easily be installed.

According an aspect of the present disclosure, a communication apparatus connectable to a network using a first wireless LAN module includes an interface configured to connect a second wireless LAN module and at least one controller configured to function as a unit that uses the second wireless LAN module for network connection without using the first wireless LAN module for network connection based on a fact that the second wireless LAN module is connected to the interface.

Further features of the embodiments in the present disclosure will become apparent from the following description of exemplary embodiments with reference to the attached drawings.

BRIEF DESCRIPTION OF THE DRAWINGS

FIGS. 8A and 8B are a flowchart illustrating an example of information processing of the MFP according to a second embodiment of the present disclosure.

DESCRIPTION OF THE EMBODIMENTS

Embodiments of the present disclosure will be described hereinbelow with reference to the drawings.

First Embodiment

Figure 1A:
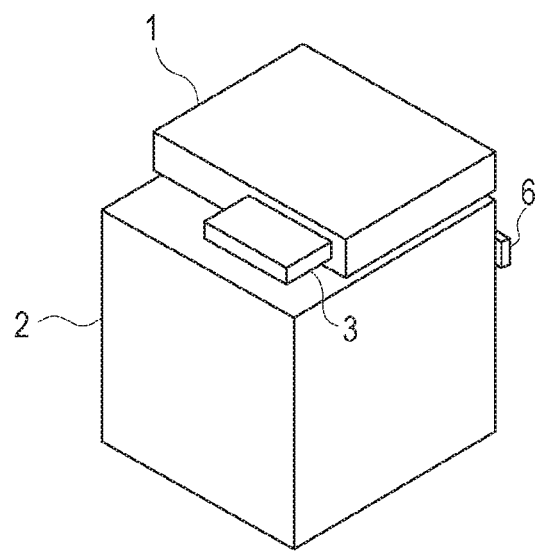
FIGS. 1A and 1B are diagrams illustrating an example of the appearance of a multifunction peripheral (MFP) to which only a standard wireless communication module is connected.
Figure 1B:
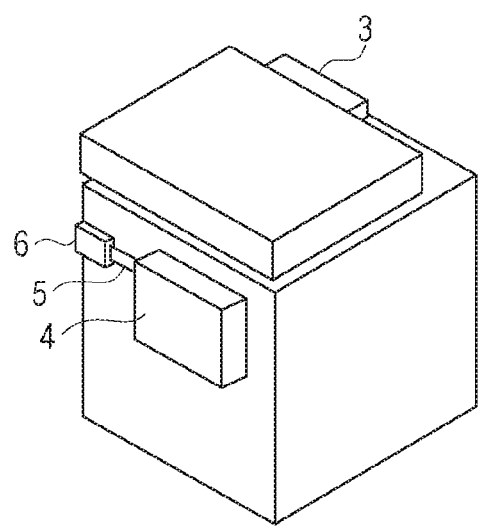

FIGS. 1A and 1B are diagrams illustrating an example of the appearance of a multifunction peripheral (MFP) to which only a standard wireless communication module is connected at factory default. FIG. 1A illustrates an example of the appearance of the MFP viewed from one direction, and FIG. 1B illustrates one example of the appearance of the MFP viewed from another direction.

A reader 1 is used to input an image. A printer 2 is used to form an image on a sheet. An operating unit 3 is used to receive an operation of the user. A control unit 4 is used to control the overall MFP. A standard wireless communication module 6 is a wireless LAN module installed as is standard, and the standard wireless communication module 6 controls data exchange via a wireless LAN. A flexible cable 5 connects the control unit 4 and the standard wireless communication module 6 together. In this MFP, the control unit 4, the flexible cable 5, and the standard wireless communication module 6 are covered with a non-metallic exterior cover (not illustrated) so that the electrical components are protected.

Figure 2A:
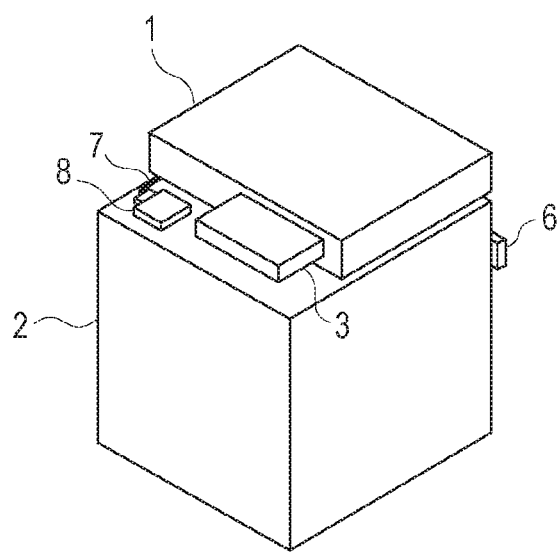
FIGS. 2A and 2B are diagrams illustrating an example of the appearance of the MFP to which an optional wireless communication module is connected in addition to the standard wireless communication module.
Figure 2B:
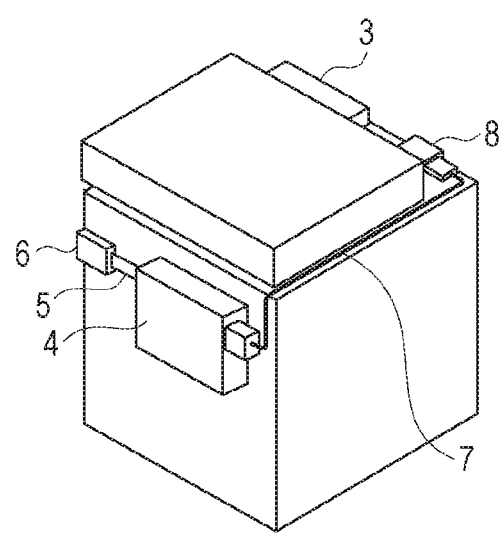

FIGS. 2A and 2B are diagrams illustrating an example of the appearance of the MFP to which an optional wireless communication module 8 is connected in addition to the standard wireless communication module 6. FIG. 2A illustrates an example of the MFP viewed from one direction, and FIG. 2B illustrates an example of the appearance viewed from another direction.

The optional wireless communication module 8 is connected to the control unit 4 using a universal serial bus (USB) cable 7. The standard wireless communication module 6 is kept connected to the MFP. In this MFP, the control unit 4, the flexible cable 5, the standard wireless communication module 6, the USB cable 7, and the optional wireless communication module 8 are covered with a non-metallic exterior cover (not illustrated) so that the electrical components are protected.

The standard wireless communication module 6 is installed at the factory before shipment of the MFP. In the present embodiment, once the standard wireless communication module 6 is installed, there is no need to detach the standard wireless communication module 6 even when the optional wireless communication module 8 is installed in the market. This may use a mechanical design that considers the ease of assembly when installing the standard wireless communication module 6 at the factory but that does not assume detachment of the standard wireless communication module 6 other than during repair in the market. For example, the standard wireless communication module 6 can be installed at a position where a large number of components have to be detached for replacement so that many working processes are needed. The flexibility of the mechanical design of the MFP improves because detachability is not taken into account.

A case where the optional wireless communication module 8 is installed after factory shipment of the MFP will be described. At that time, if there is a need to detach the standard wireless communication module 6 and replace it with the optional wireless communication module 8, it may be useful to achieve ease of detachability of the standard wireless communication module 6 in the market. However, the present embodiment does not need to detach the standard wireless communication module 6 when another wireless communication module is installed as an option after factory shipment of the MFP. This suppresses an increase in cost for improving the ease of detachability of the standard wireless communication module 6 and for providing the effect of increasing the flexibility of mechanical design. When the standard wireless communication module 6 is to be detached, an exterior cover (not illustrated) is detached so that the standard wireless communication module 6 is accessed. A member that fixes the standard wireless communication module 6 is detached, the connected flexible cable 5 is detached, and thereafter the exterior cover has to be attached.

To install the optional wireless communication module 8, the exterior cover (not illustrated) has to be detached to install the optional wireless communication module 8 and the USB cable 7. Furthermore, it is necessary to fix the optional wireless communication module 8, to connect the USB cable 7, and to attach the exterior cover.

The present embodiment has the advantage of eliminating the need for a series of works for detaching the standard wireless communication module 6, described above.

Figure 3:
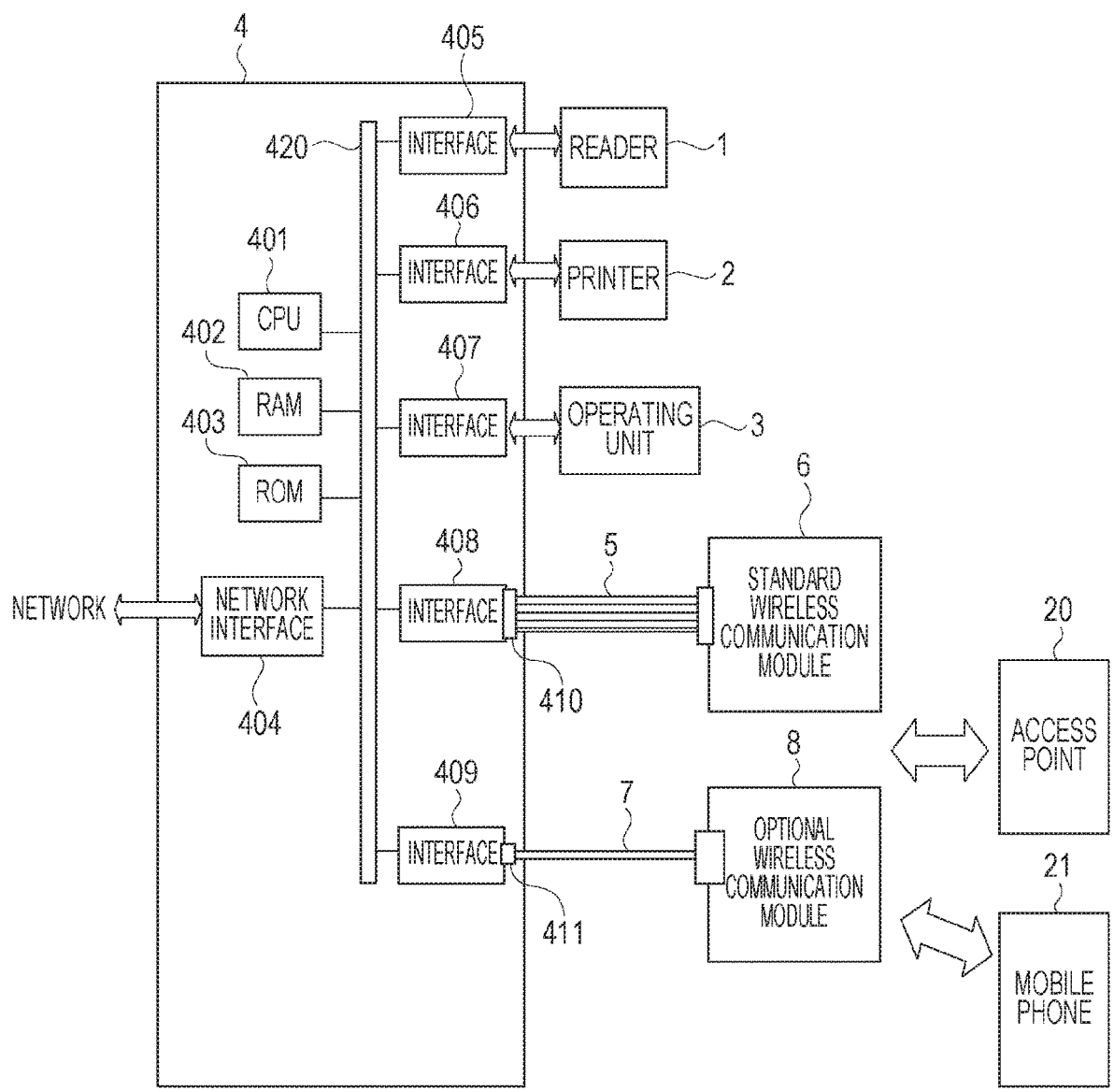
FIG. 3 is a diagram illustrating an example of the hardware configuration of the MFP.

FIG. 3 is a diagram illustrating an example of the hardware configuration of the MFP. In addition to the standard wireless communication module 6, the optional wireless communication module 8 is connected to the MFP. The MFP is an example of a communication apparatus and an image forming apparatus.

Figure 6:
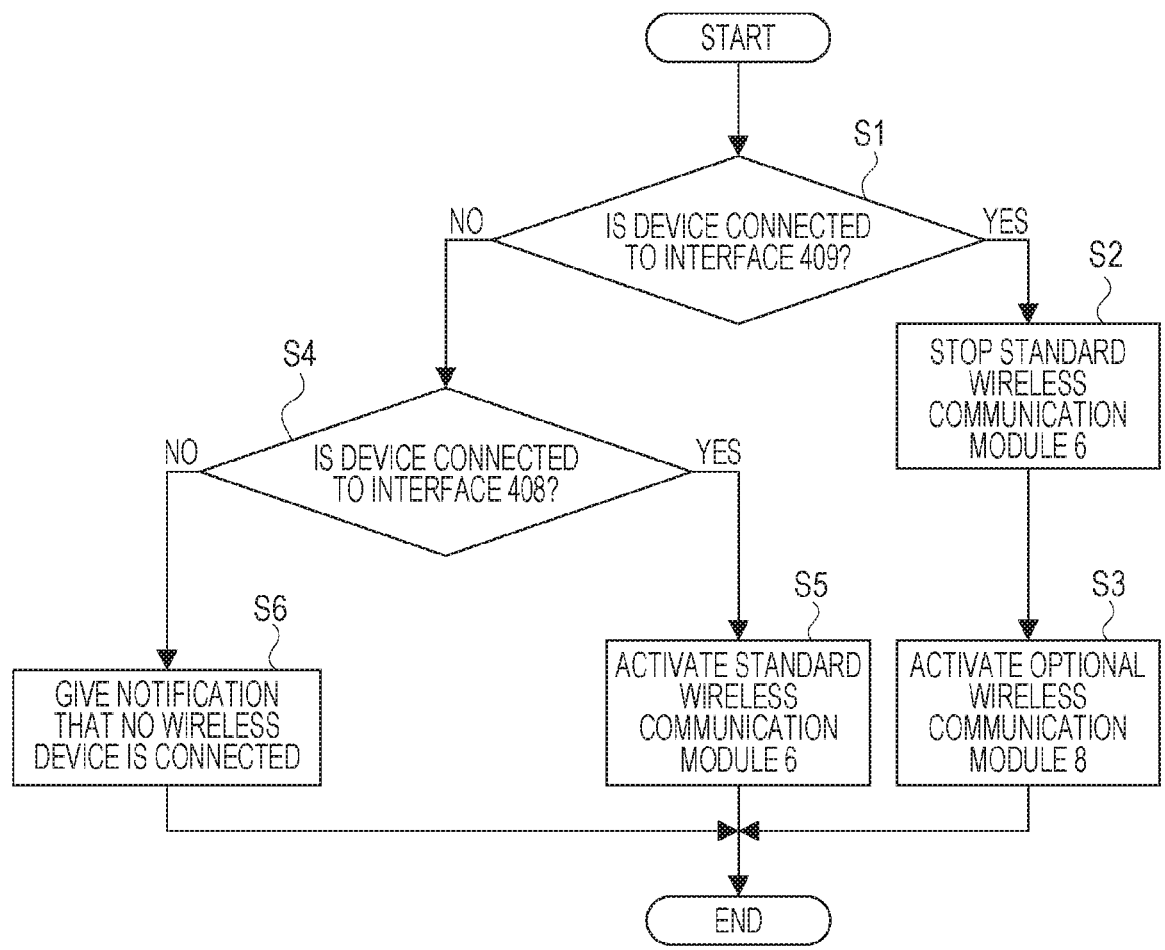
FIG. 6 is a flowchart illustrating an example of information processing of the MFP according to a first embodiment of the present disclosure.
Figure 8A:
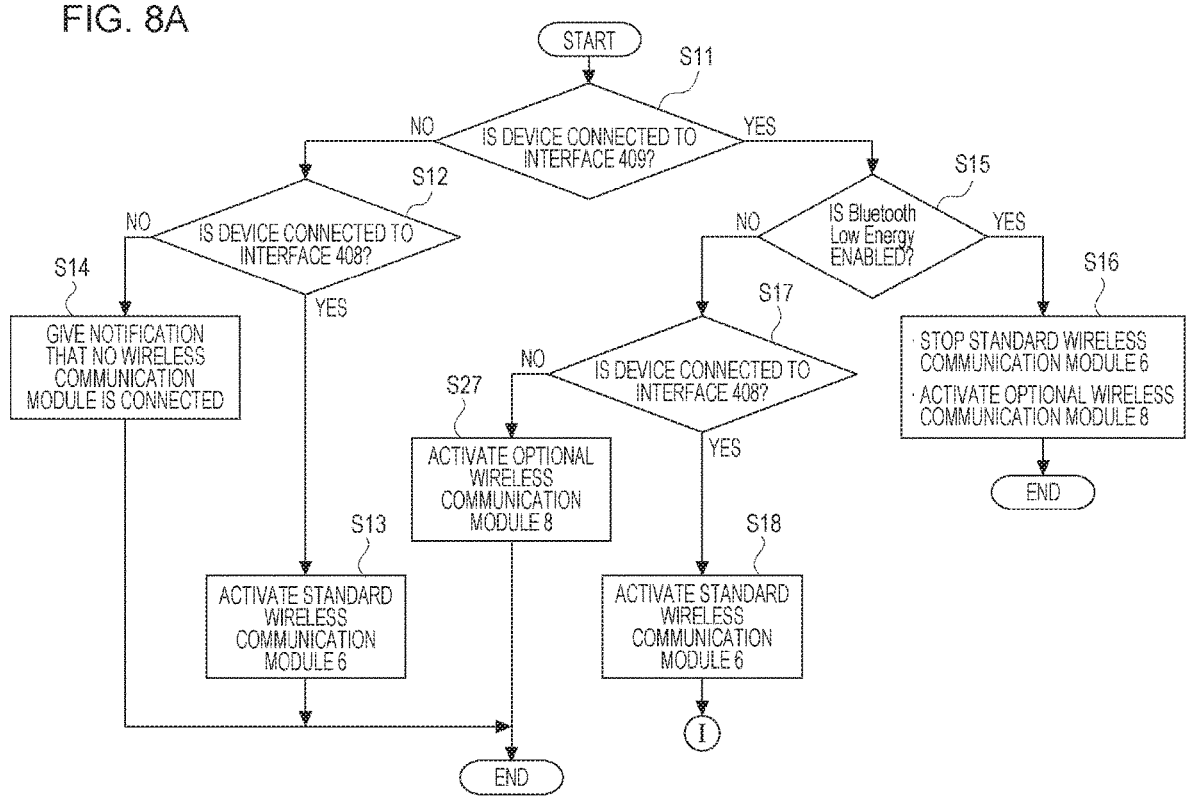

Hardware components 401 to 409 are connected via an internal bus 420 so as to communicate with each other. The central processing unit (CPU) 401 moves programs stored in the read only memory (ROM) 403 to the random access memory (RAM) 402. The CPU 401 executes processes based on the moved programs to execute the function of the control unit 4 (or the MFP) and the processes of the flowcharts in FIG. 6 and FIGS. 8A and 8B. The ROM 403 stores the programs and data that the CPU 401 uses when executing the processes. The RAM 402 is used as a work area for the CPU 401 to use in executing processes based on the programs. The network interface 404 is used to connect the control unit 4 (or the MFP) to a network. The interface 405 is used to connect the control unit 4 to the reader 1. The interface 406 is used to connect the control unit 4 to the printer 2. The interface 407 is used to connect the control unit 4 to the operating unit 3. The interface 408 is a USB interface for connecting the control unit 4 to the standard wireless communication module 6. The interface 408 is connected using a connector 410 for connecting the flexible cable 5. The interface 409 is a USB interface for connecting the control unit 4 to the optional wireless communication module 8. The interface 409 is connected using a connector 411 for connecting the USB cable 7. The standard wireless communication module 6 is installed in the MFP as standard. In this embodiment, the standard wireless communication module 6 is compatible with IEEE 802.11b/g/n and is connected to the interface 408 with the flexible cable 5. The optional wireless communication module 8 is connected optionally. In this embodiment, the optional wireless communication module 8 is a combo module having the two functions of a wireless LAN function compatible with IEEE 802.11b/g/n and a Bluetooth® Low Energy function. The optional wireless communication module 8 is connected to the connector 411 with the USB cable 7. The Bluetooth® Low Energy function is an example of a first wireless communication function. The wireless LAN function is an example of a second wireless communication function. An access point 20 communicates with the standard wireless communication module 6 or the optional wireless communication module 8, which are slaves. A mobile terminal 21 is, for example, a smartphone, which communicates with the optional wireless communication module 8 via Bluetooth® Low Energy. The function of the MFP and the processes of the flowcharts in FIGS. 6, 8A, and 8B are implemented by the CPU 401 based on the programs stored in the ROM 403.

Figure 4:
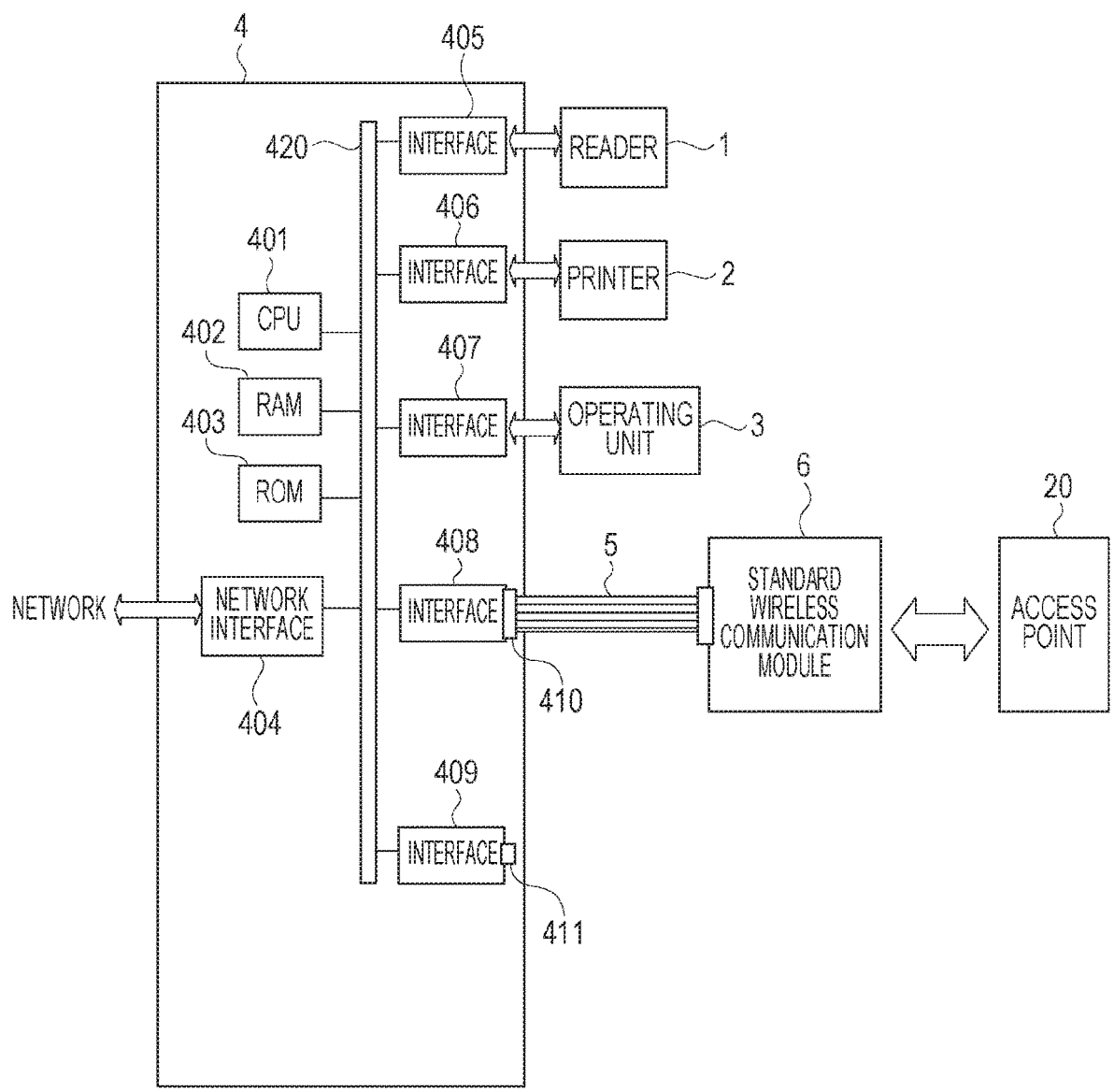
FIG. 4 is a diagram illustrating an example of the hardware configuration of the MFP at factory default.

FIG. 4 is a diagram illustrating an example of the hardware configuration of the MFP using factory default settings. The MFP is connected to the standard wireless communication module 6.

Figure 5A:
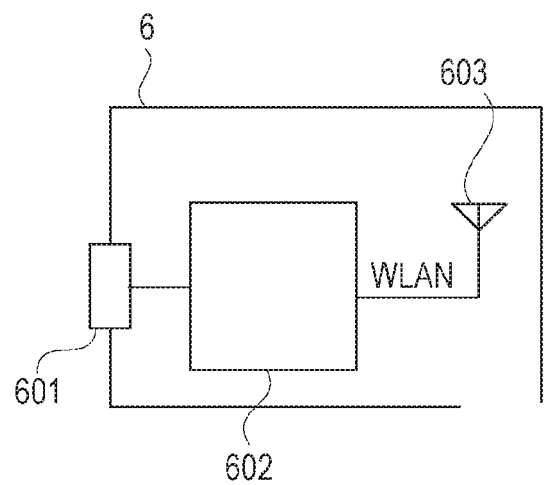
FIG. 5A is a diagram illustrating an example of the hardware configuration of the standard wireless communication module.

FIG. 5A is a diagram illustrating an example of the hardware configuration of the standard wireless communication module 6. A connector 601 is used to connect the standard wireless communication module 6 to the connector 410 on the controller side with the flexible cable 5. A controller chip 602 is a communication controller large-scale integrated circuit (LSI) conforming to IEEE 802.11b/g/n. An antenna 603 is a pattern antenna formed on the substrate.

Figure 5B:
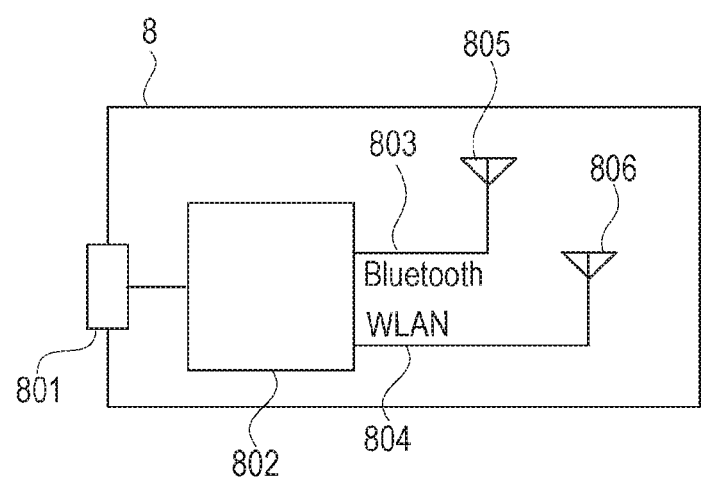
FIG. 5B is a diagram illustrating an example of the hardware configuration of the optional wireless communication module.

FIG. 5B is a diagram illustrating an example of the hardware configuration of the optional wireless communication module 8.

A connector 801 is used to connect the standard wireless communication module 6 to the connector 411 on the controller side with the USB cable 7. A controller chip 802 is a communication controller LSI having both functions of IEEE 802.11b/g/n and Bluetooth®. A radio frequency (RF) signal line 803 is a Bluetooth® RF signal line for connecting the controller chip 802 and an antenna 805 together. An RF signal line 804 is a wireless LAN RF signal line for connecting the controller chip 802 and an antenna 806 together.

The antenna 805 and the antenna 806 are respectively pattern antennas for Bluetooth® and wireless LAN which are formed on the substrate.

FIG. 6 is a flowchart illustrating an example of information processing of the MFP of the first embodiment.

In S1, the CPU 401 determines whether a device is connected to the interface 409 for an optional device. If the CPU 401 determines that a device is connected to the interface 409, the process goes to S2. If the CPU 401 determines that no device is connected to the interface 409, the process goes to S4. For example, if the USB cable 7 is connected to the connector 411, and the CPU 401 detects the optional wireless communication module 8 by USB communication via the USB cable 7, then the CPU 401 determines that a device is connected to the interface 409.

In S2, the CPU 401 stops the standard wireless communication module 6. In other words, the CPU 401 stops the standard wireless communication module 6 according to the determination that a device is connected to the interface 409 which is for an optional device.

In S3, the CPU 401 activates the optional wireless communication module 8.

In S4, the CPU 401 determines whether a device is connected to the interface 408 for a standard device. If the CPU 401 determines that a device is connected to the interface 408, the process goes to S5, and if the CPU 401 determines that no device is connected to the interface 408, the process goes to S6. For example, if the flexible cable 5 is connected to the connector 410, and the standard wireless communication module 6 is detected by communication via the flexible cable 5, the CPU 401 determines that a device is connected to the interface 408.

In S5, the CPU 401 activates the standard wireless communication module 6.

In S6, the CPU 401 gives a notification that no wireless communication module is connected. For example, the CPU 401 gives a notification that no wireless communication module is connected by displaying the fact that no wireless communication module is connected on a display of the operating unit 3 or the like.

In the present embodiment, the standard wireless communication module 6 is disposed on the back of the MFP, but this is given for mere illustration and is not limited to the back. In the present embodiment, optional functions can be implemented by disposing the optional wireless communication module 8 at another location without detaching the standard wireless communication module 6.

Second Embodiment

In installing a wireless communication module on a MFP, the position on the MFP influences the way radio waves propagate to a communication target. A decrease in receiving sensitivity can increase the possibility that the communication speed decreases or the communication is interrupted. The second embodiment prevents a decrease in receiving sensitivity, which can occur due to the relationship between the position where the wireless communication module is installed and the position of the access point.

Figure 7:
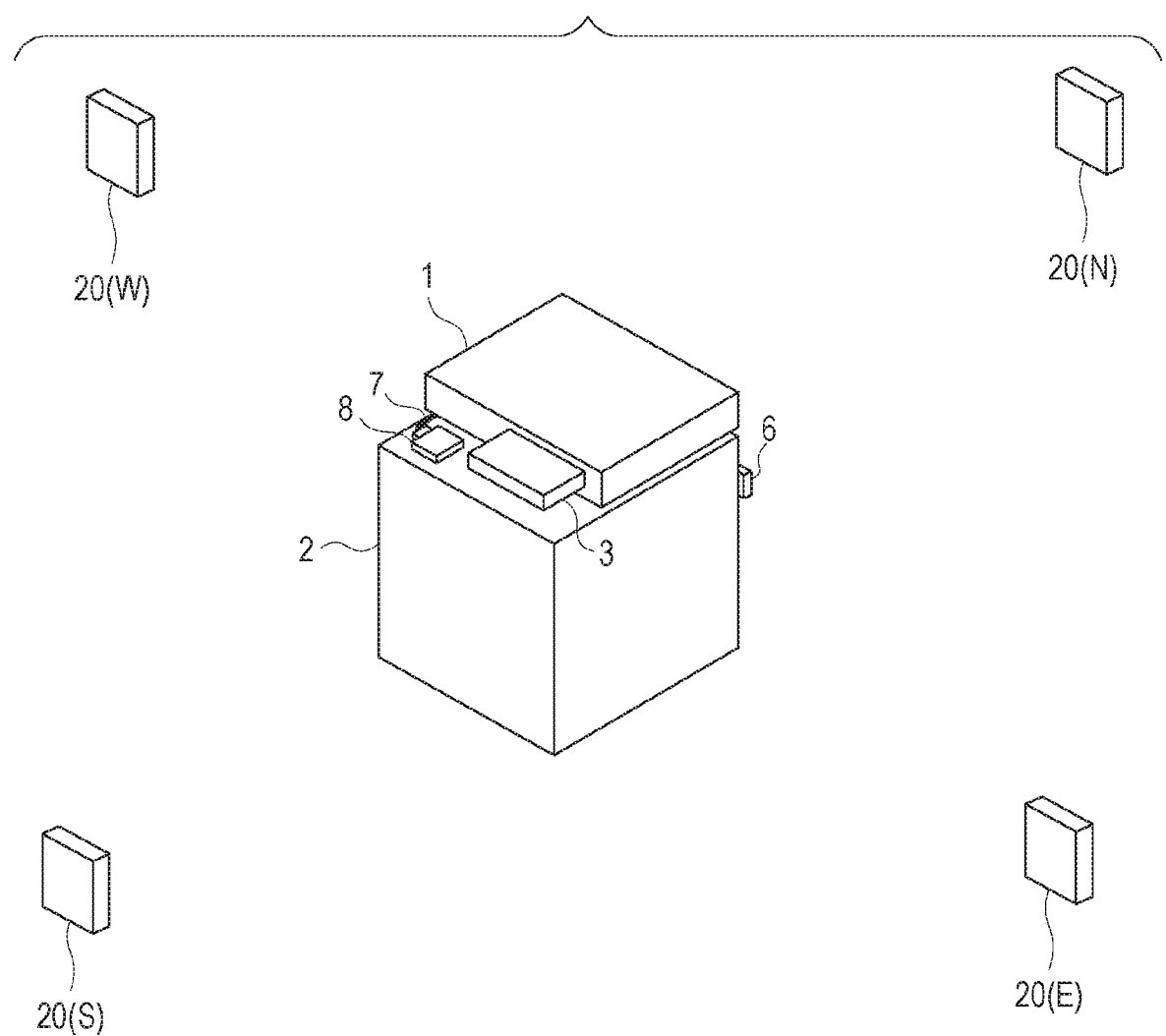
FIG. 7 is a diagram illustrating the relationship between the positions of the wireless communication modules and the positions of access points.

FIG. 7 is a diagram illustrating the relationships between the positions of the wireless communication modules mounted to the MFP and the positions of access points which are communication targets. The mount positions include the position of the standard wireless communication module 6 and the position of the optional wireless communication module 8. The access points are opposed in four directions from the MFP. The positions of the access points include an access point 20(N), an access point 20(E), an access point 20(W), and an access point 20(S). Assuming that no radio-wave reflector is present in the surroundings, a change in communication signal level due to the position of the wireless communication module on the MFP and the positions of the access points are as follows.

At the position of the standard wireless communication module 6, the reception level is maximum at the access point (N). The reception level is high next to N at the positions of W and E. The reception level is lowest at the position of S.

At the position of the optional wireless communication module 8, the reception level is maximum at the access point (S). The reception level is high next to S at the positions of W and E. The reception level is lowest at the position of N.

Thus, activating a wireless communication module mounted at a position where the reception level is maximum according to the position of the access point provides a good radio communication environment. Here, the standard wireless communication module 6 has a single wireless LAN function, and the optional wireless communication module 8 has the functions of wireless LAN and Bluetooth® Low Energy.

FIGS. 8A and 8B illustrate a flowchart illustrating an example of information processing performed by the MFP.

In S11, the CPU 401 determines whether a device is connected to the interface 409 for an optional device. If the CPU 401 determines that a device is connected to the interface 409, the process goes to S15, and if the CPU 401 determines that no device is connected to the interface 409, the process goes to S12. For example, if the USB cable 7 is connected to the connector 411, and the optional wireless communication module 8 is detected by USB communication via the USB cable 7, the CPU 401 determines that a device is connected to the interface 409.

In S12, the CPU 401 determines whether a device is connected to the interface 408 for a standard device. If the CPU 401 determines that a device is connected to the interface 408, the process goes to S13. If the CPU 401 determines that no device is connected to the interface 408, the process goes to S14. For example, if the flexible cable 5 is connected to the connector 410, and the CPU 401 detects the standard wireless communication module 6 by communication via the flexible cable 5, then the CPU 401 determines that a device is connected to the interface 408.

In S13, the CPU 401 activates the standard wireless communication module 6.

In S14, the CPU 401 gives a notification that no wireless communication module is connected. For example, the CPU 401 may give a notification that no wireless communication module is connected by displaying the fact that no wireless communication module is connected on the display of the operating unit 3 or the like.

In S15, the CPU 401 determines whether the optional wireless communication module 8 connected as an option is configured so that the Bluetooth® Low Energy function is enabled at the MFP. If the optional wireless communication module 8 is configured so that the Bluetooth® Low Energy function is enabled at the MFP, the process goes to S16, and if not, the process goes to S17.

In S16, the CPU 401 enables the optional wireless communication module 8 for operation. At that time, the CPU 401 stops the standard wireless communication module 6.

In S17, the CPU 401 determines whether a device is connected to the interface 408 for a standard device. If the CPU 401 determines that a device is connected to the interface 408, the process goes to S18, and if the CPU 401 determines that no device is connected to the interface 408, the process goes to S27. For example, if the flexible cable 5 is connected to the connector 410, and the CPU 401 can detect the standard wireless communication module 6 by communication via the flexible cable 5, the CPU 401 determines that a device is connected to the interface 408.

In S27, the CPU 401 activates the optional wireless communication module 8.

In the processes after S18, the CPU 401 implements the wireless LAN function using one of the standard wireless communication module 6 and the optional wireless communication module 8 having stronger signal intensity for the communication partner.

In S18, the CPU 401 activates the standard wireless communication module 6.

In S19, the CPU 401 measures the level of a signal that the standard wireless communication module 6 received from the access point and stores the measured value a. The measured value a is an example of a first value indicating the radio wave intensity for the communications partner when the standard wireless communications module 6 is operated.

In S20, the CPU 401 stops the operation of the standard wireless communication module 6.

In S21, the CPU 401 activates the optional wireless communication module 8.

In S22, the CPU 401 measures the level of a signal that the optional wireless communication module 8 received from the access point and stores the measured value b. The measured value b is an example of a second value indicating the radio wave intensity for the communications partner when the optional wireless communication module 8 is operated.

In S23, the CPU 401 stops the operation of the optional wireless communication module 8.

In S24, the CPU 401 determines whether value b is greater than value a based on the measured value a and the measured value b. If the CPU 401 determines that value b is greater than value a, the process goes to S25, and if not, the process goes to S26.

In S25, the CPU 401 activates the optional wireless communication module 8, which has a higher reception level.

In S26, the CPU 401 activates the standard wireless communication module 6, which has a higher reception level.

Third Embodiment

In the first embodiment, the activation and stop of the standard wireless communication module 6 and the optional wireless communication module 8 are controlled according to their connection states. In the present embodiment, in addition to the control on the activation and stop of each module, control of power supply to each module is performed. The basic configuration of the present embodiment is the same as that of the first embodiment. Accordingly, the same components are given the same reference signs, and their detailed descriptions will be omitted.

[Interface]

In the present embodiment, power feeding to the USB device is controlled using the interfaces 408 and 409. Here, the detailed configurations of the interfaces 408 and 409 will be described.

Figure 9A:
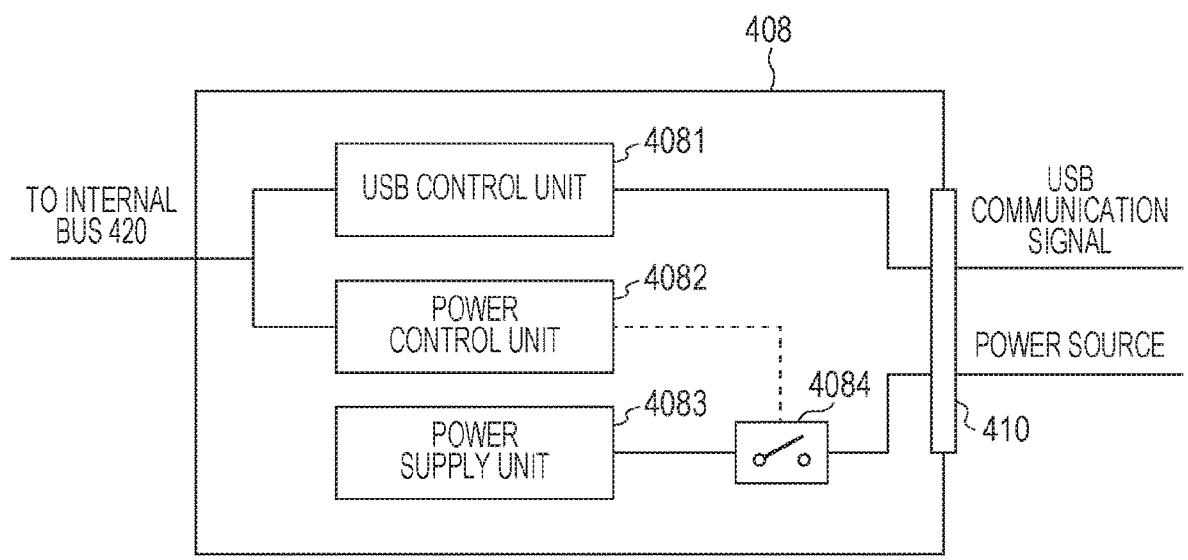
FIG. 9A is a diagram illustrating the internal configuration of an interface 408.

FIG. 9A is a diagram illustrating the internal configuration of the interface 408.

A USB control unit 4081 is used to control USB communication with the standard wireless communication module 6. The USB control unit 4081 is connected to the standard wireless communication module 6 via the connector 410 and the flexible cable 5. The USB control unit 4081 is controlled by the CPU 401 via the internal bus 420.

A power control unit 4082 controls power supply to the standard wireless communication module 6. The power control unit 4082 is connected to the standard wireless communication module 6 via the connector 410 and the flexible cable 5. The power control unit 4082 is controlled by the CPU 401 via the internal bus 420.

A power supply unit 4083 is used to supply power to the standard wireless communication module 6. In this embodiment, the power supply unit 4083 supplies a power of 5 V based on an input from a main power source (not illustrated). When the power supply unit 4083 is connected to the standard wireless communication module 6, a power of 0.1 W to 1.25 W is consumed according to the operating state of the standard wireless communication module 6.

A switch 4084 switches between power supply and stop to/from the standard wireless communication module 6. The ON and OFF of the switch 4084 is controlled by the power control unit 4082. When the switch 4084 is ON, power is supplied to the standard wireless communication module 6, and when the switch 4084 is OFF, the power supply is stopped.

Figure 9B:
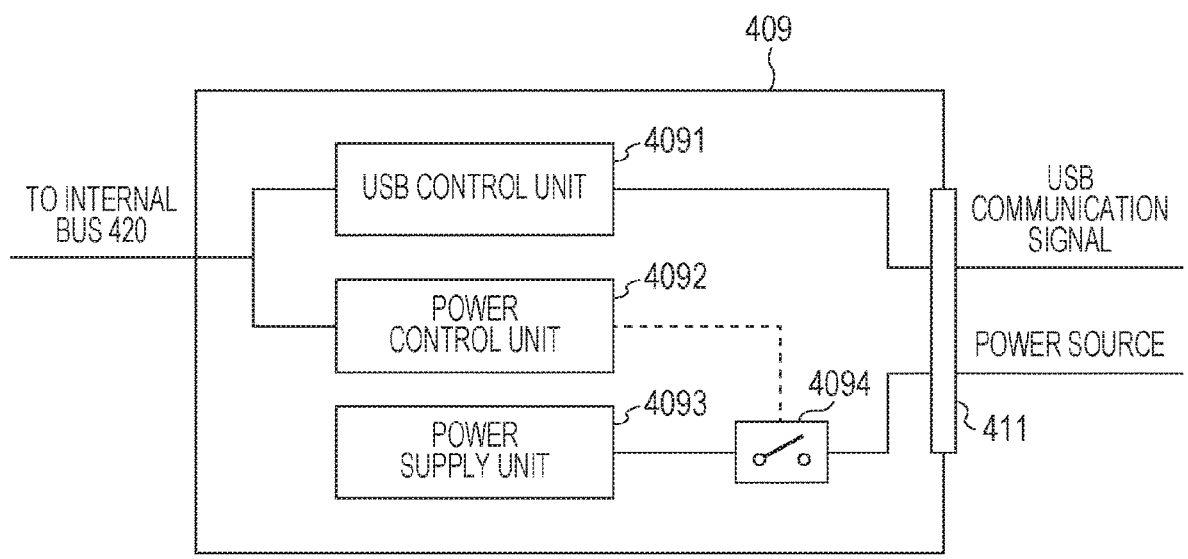
FIG. 9B is a diagram illustrating the internal configuration of an interface 409.

FIG. 9B is a diagram illustrating the internal configuration of the interface 409.

A USB control unit 4091 is used to control USB communication with the optional wireless communication module 8. The USB control unit 4091 is connected to the optional wireless communication module 8 via the connector 411 and the USB cable 7. The USB control unit 4091 is controlled by the CPU 401 via the internal bus 420.

A power control unit 4092 controls power supply to the optional wireless communication module 8. The power control unit 4092 is connected to the optional wireless communication module 8 via the connector 411 and the USB cable 7. The power control unit 4092 is controlled by the CPU 401 via the internal bus 420.

A power supply unit 4093 is used to supply power to the optional wireless communication module 8. In this embodiment, the power supply unit 4093 supplies a power of 5 V based on an input from a main power source (not illustrated). When the power supply unit 4093 is connected to the optional wireless communication module 8, a power of 0.1 W to 1.5 W is consumed according to the operating state of the optional wireless communication module 8.

A switch 4094 switches between power supply and stop to/from the optional wireless communication module 8. The ON and OFF of the switch 4094 is controlled by the power control unit 4092. When the switch 4094 is ON, power is supplied to the optional wireless communication module 8, and when the switch 4094 is OFF, the power supply is stopped.

[Device Starting Process]

The present embodiment is configured to obtain a product ID when starting a wireless LAN device, thereafter loading a USB driver, and downloading firmware. Since the kind of the USB device connected is identified using the product ID, a correct starting operation can be performed.

First, a process for obtaining the product ID will be described.

Each USB device has a product ID unique to the device. Reading the product ID by USB communication control allows identifying the USB device.

In the present embodiment, the controller chip 602 of the standard wireless communication module 6 connected by USB via the interface 408 has a unique product ID. Likewise, the controller chip 802 of the optional wireless communication module 8 connected by USB via the interface 409 has a product ID.

These product IDs can be read by the CPU 401 of the control unit 4 controlling the USB control unit 4081 or the USB control unit 4091. This allows the CPU 401 to identify the controller chip 602 and the controller chip 802 connected using the read product IDs.

Next, loading of the USB driver will be described.

In order for the control unit 4 to control the operation of the device connected by USB, a USB driver corresponding to the device is necessary. In other words, in order to operate the standard wireless communication module 6 by USB connection, it is necessary for the control unit 4 to load a USB driver corresponding to the controller chip 602 of the standard wireless communication module 6. In order to operate the optional wireless communication module 8 by USB connection, the control unit 4 needs to load a USB driver corresponding to the controller chip 802 of the optional wireless communication module 8.

For that reason, the CPU 401 identifies the connected USB device based on the product ID read in the product-ID acquisition process. This allows the CPU 401 to load a USB driver for the controller chip 602 and a USB driver for the controller chip 802 without mistake. These USB drivers are stored in advance in the ROM 403.

By loading the USB drivers as described above, the control unit 4 can control the operation of the controller chip 602 of the standard wireless communication module 6 and the controller chip 802 of the optional wireless communication module 8 via the USB.

Next, downloading of firmware will be described.

In order for the controller chip 602 of the standard wireless communication module 6 and the controller chip 802 of the optional wireless communication module 8 to start a communication operation, it is necessary to download corresponding firmware for use. The present embodiment is configured to download firmware for communication control during every start-up.

The CPU 401 loads the USB drivers by the above operation and controls the operation of the controller chip 602 and the controller chip 802 to thereby download corresponding firmware. The firmware for the controller chip 602 and the controller chip 802 to perform communication control is stored in advance in the ROM 403.

Executing the above process allows the controller chip 602 of the standard wireless communication module 6 and the controller chip 802 of the optional wireless communication module 8 to perform communication control. In other words, a wireless communication operation is executed to enable network connection.

[Procedure]

Figure 10:
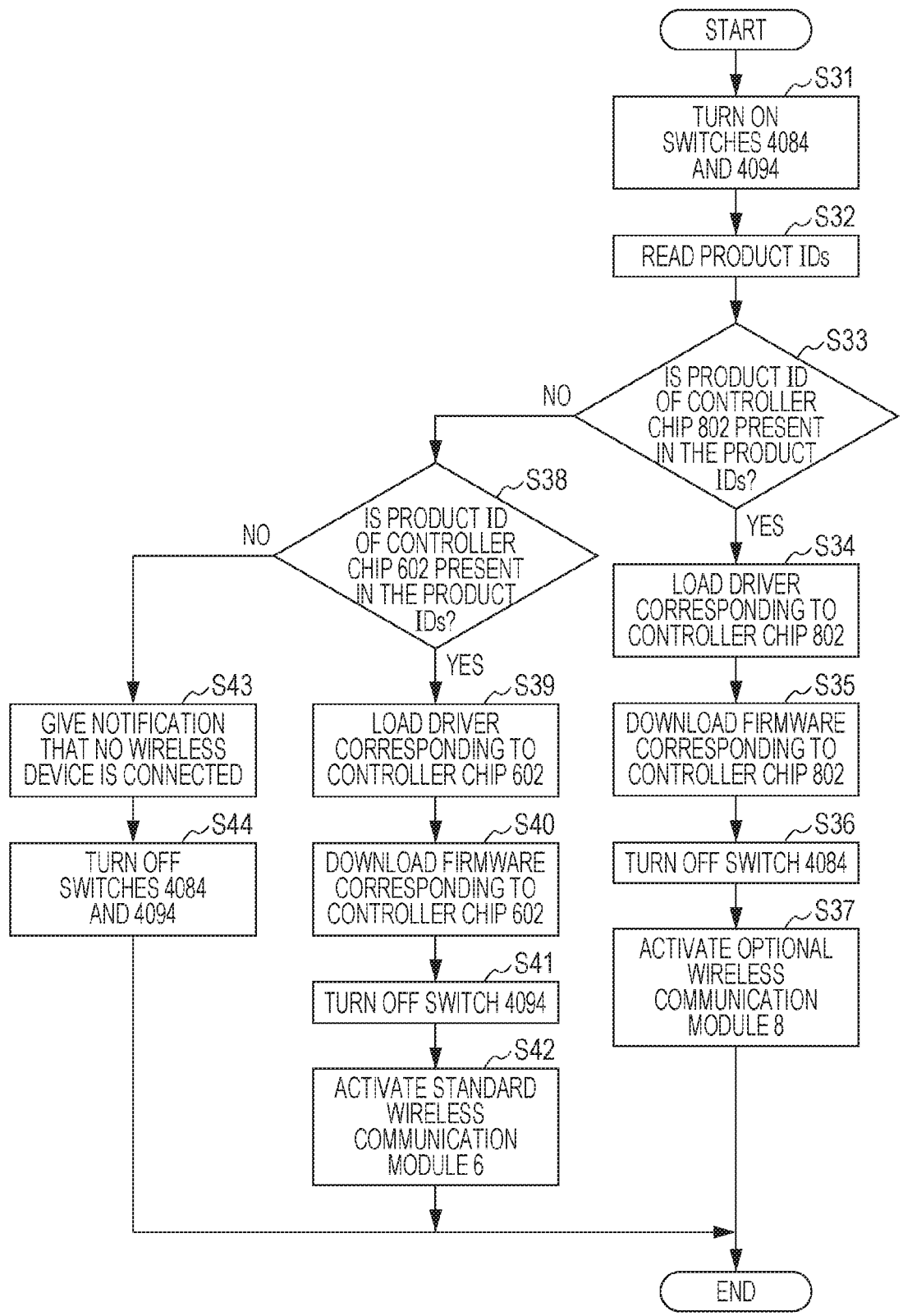
FIG. 10 is a diagram illustrating the control procedure of a third embodiment of the present disclosure.

The procedure of the device starting process will be described using FIG. 10. FIG. 10 is a diagram illustrating the control procedure of the third embodiment.

In S31, the CPU 401 controls the power control unit 4082 and the power control unit 4092 to respectively turn on the switch 4084 and the switch 4094.

This causes the connected devices to be supplied with power from the power supply unit 4083 and the power supply unit 4093.

In S32, the CPU 401 controls the USB control unit 4081 and the USB control unit 4091 to read product IDs from the connected devices.

In other words, the CPU 401 reads a product ID from a device connected to the interface 408.

The CPU 401 reads a product ID also from a device connected to the interface 409.

In S33, the CPU 401 determines whether the product IDs read in S32 include the product ID set to the controller chip 802.

If in S33 the CPU 401 determines that the product ID set to the controller chip 802 is present, the process goes to S34.

In this case, the optional wireless communication module 8 is connected to the interface 409.

If the CPU 401 determines that the product ID set to the controller chip 802 is not present, the process goes to S38.

In S34, the CPU 401 reads a USB driver corresponding to the controller chip 802, stored in the ROM 403, and loads the USB driver to the USB control unit 4091.

This allows the control unit 4 to control the operation of the controller chip 802 of the optional wireless communication module 8.

In S35, the CPU 401 reads firmware corresponding to the controller chip 802, stored in the ROM 403.

The CPU 401 downloads the firmware corresponding to the controller chip 802 of the optional wireless communication module 8 connected to the interface 409 via the USB control unit 4091.

This allows the controller chip 802 of the optional wireless communication module 8 to perform a wireless communication operation.

In S36, the CPU 401 controls the power control unit 4082 to turn off the switch 4084.

In other words, the optional wireless communication module 8 is connected for use to the interface 409 for an optional device, and the CPU 401 stops power supply to the standard wireless communication module 6 connected to the interface 408.

In S37, the CPU 401 controls the controller chip 802 of the optional wireless communication module 8 connected to the interface 409 via the USB control unit 4091. This allows the control unit 4 to activate the optional wireless communication module 8 to perform wireless communication.

As described above, if in S33 the CPU 401 determines that the product ID set to the controller chip 802 is not present, the process goes to S38. This is a case where the optional wireless communication module 8 is not connected to the interface 409 for an optional device.

In S38, the CPU 401 determines whether the product IDs read in S32 include the product ID set to the controller chip 602.

If in S38 the CPU 401 determines that the product ID set to the controller chip 602 is present, the process goes to S39.

In contrast, if the CPU 401 determines that the product ID set to the controller chip 802 is not present, the process goes to S43.

In S39, the CPU 401 reads a USB driver corresponding to the controller chip 602, stored in the ROM 403, and loads the USB driver to the USB control unit 4081.

This allows the control unit 4 to control the operation of the controller chip 602 of the standard wireless communication module 6.

In S40, the CPU 401 reads firmware corresponding to the controller chip 602, stored in the ROM 403.

Then, the CPU 401 downloads the firmware corresponding to the controller chip 602 of the standard wireless communication module 6 connected to the interface 408 via the USB control unit 4081.

This allows the controller chip 602 of the standard wireless communication module 6 to perform a wireless communication operation.

In S41, the CPU 401 controls the power control unit 4092 to turn off the switch 4094. In other words, assuming that the optional wireless communication module 8 is not connected to the interface 409 for an optional device, power supply via the interface 409 is stopped.

In S42, the CPU 401 controls the controller chip 602 of the standard wireless communication module 6 connected to the interface 408 via the USB control unit 4081. This causes the control unit 4 to activate the standard wireless communication module 6 for wireless communication.

If in S38 the CPU 401 determines that the product ID set to the controller chip 802 is not present, the process goes to S43.

This is a case where the optional wireless communication module 8 is not connected to the interface 409 for an optional device, and also the standard wireless communication module 6 is not connected to the interface 408 for a standard device.

In S43, the CPU 401 gives a notification that no wireless communication module is connected. For example, the CPU 401 gives a notification that no wireless communication module is connected by displaying the fact that no wireless communication module is connected on the display of the operating unit 3 or the like.

In S44, the CPU 401 controls the power control unit 4082 and the power control unit 4092 to turn off the switch 4084 and the switch 4094, respectively.

As described above, the present embodiment allows loading of the drivers for the optional wireless communication module 8 and the standard wireless communication module 6 and downloading of firmware thereof according to whether the optional wireless communication module 8 is connected. This simplifies the work for installing the optional wireless communication module 8. In other words, this reduces man-hours of the installation work and the occurrence of installation errors of the worker.

Furthermore, power can be supplied to a wireless communication module to be used out of the optional wireless communication module 8 and the standard wireless communication module 6, and power supply to the other wireless communication module not used can be stopped. This reduces power consumption, providing excellent energy savings.

As illustrated in FIG. 5B, the optional wireless communication module 8 employs a combo chip (an IC chip, or an integrated circuit) having a Bluetooth® function and a wireless LAN function. This provides a Bluetooth® Low Energy function having a higher performance than chips that have only a Bluetooth® Low Energy function. For example, a chip having only a Bluetooth® Low Energy function can connect to about five terminals at the same time, while a combo chip can connect to about ten terminals.

Connecting the optional wireless communication module 8 allows using various functions using Bluetooth® Low Energy. For example, a Bluetooth® Low Energy touch login function for connecting the MFP and the mobile terminal 21 by Bluetooth® Low Energy to exchange identification information, thereby achieving logging in the MFP, can be used. The Bluetooth® Low Energy touch login function is executed when the mobile terminal 21 is brought close to the optional wireless communication module 8. For that purpose, a touch mark is attached on the exterior cover of the optional wireless communication module 8. Furthermore, a Bluetooth® Low Energy scanning function of transmitting an image read by the reader 1 to the mobile terminal 21 using Bluetooth® Low Energy communication can be used.

Furthermore, the present embodiment provides a Bluetooth® Low Energy print function for obtaining print data and image data for use in printing in the printer 1 from the mobile terminal 21 using Bluetooth® Low Energy communication. Furthermore, the present embodiment provides a Bluetooth® Low Energy synchronization function for synchronizing address information managed by the MFP, such as e-mail address, and address information managed by the mobile terminal 21 using Bluetooth® Low Energy communication. Furthermore, the present embodiment provides a Wi-Fi® handover function for transmitting connection information (for example, a service set identifier (SSID) or a key) from the MFP to the mobile terminal 21 using Bluetooth® Low Energy communication to establish Wi-Fi® communication on the mobile terminal 21. The Wi-Fi® destination of the mobile terminal may be either the MFP (direct connection) or the access point 20 (infrastructure connection).

When a Wi-Fi® connection is established using the optional wireless communication module 8 or the standard wireless communication module 6, the MFP can use Wi-Fi® communication. This allows the MFP to transmit an image read by the reader 1 to an external apparatus using Wi-Fi® communication. The MFP can also receive print data and image data for use in printing by the printer 2 from an external apparatus using Wi-Fi® communication. Furthermore, the MFP can synchronize address information with an external apparatus using Wi-Fi® communication.

Fourth Embodiment

The first embodiment is configured to automatically determine a wireless communication module to be used based on the fact that the optional wireless communication module 8 and the standard wireless communication module 6 are connected. The fourth embodiment is configured to determine a wireless communication module to be used after a user instruction is confirmed based on the fact that the optional wireless communication module 8 is connected. The basic configuration of the fourth embodiment is the same as the configuration of the first embodiment. The same components are denoted by the same reference signs, and detailed description thereof will be omitted.

The operating unit 3 includes a display unit, such as a display, and an input unit, such as a touch sensor that detects a touch on the display or a hard key.

Figure 11A:
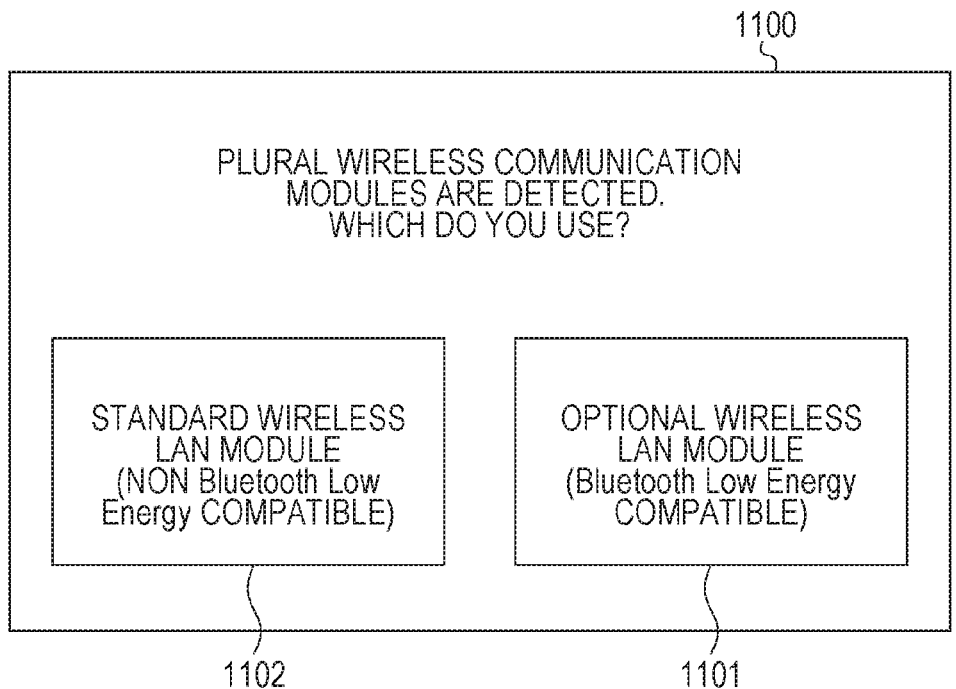
FIG. 11A is a diagram illustrating a confirmation screen.
Figure 11B:
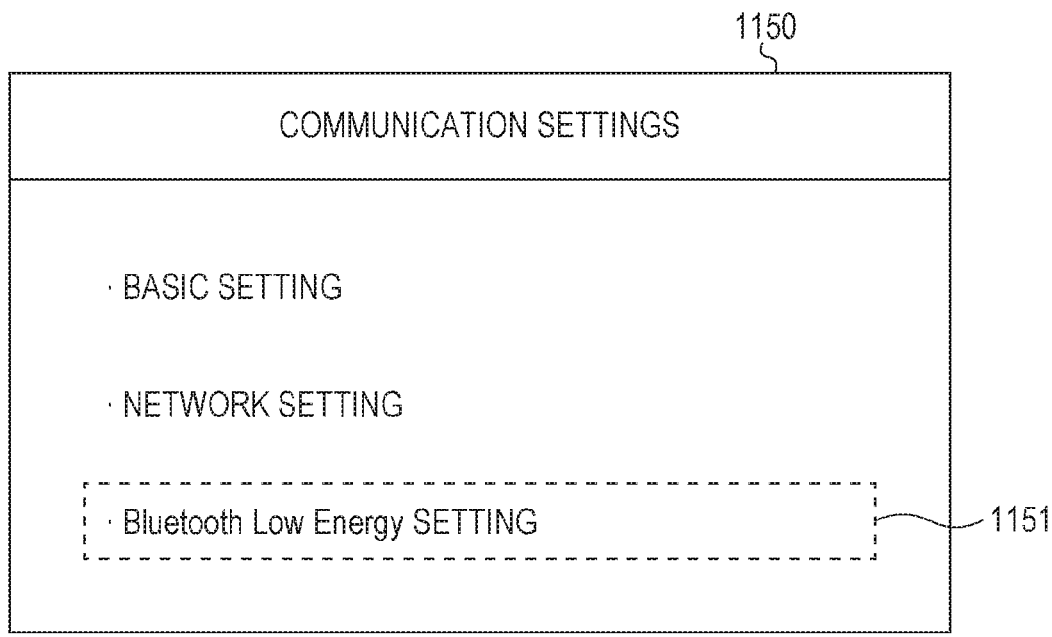
FIG. 11B is a diagram illustrating a setting screen.

The display of the operating unit 3 displays a screen as illustrated in FIGS. 11A and 11B. FIG. 11A is a diagram illustrating a confirmation screen. FIG. 11B is a diagram illustrating a setting screen.

As illustrated in FIG. 11A, the confirmation screen 1100 is provided with a message that prompts the user to operate a soft key 1101 or a soft key 1102.

The confirmation screen 1100 is displayed when both of the standard wireless communication module 6 and the optional wireless communication module 8 are connected at the start-up of the MFP and is used to designate a wireless LAN module to be used.

The soft key 1101 is a button that is selected when it is determined to use the optional wireless communication module 8. The soft key 1102 is a button that is selected when it is determined to use the standard wireless communication module 6.

Thus, providing the confirmation screen 1100 on which candidates of a wireless LAN module to be used are displayed allows setting a wireless LAN module with a simple operation while confirming the intention of the user. This screen may be displayed only at the first time in the case where both of the standard wireless communication module 6 and the optional wireless communication module 8 are connected at the start-up of the MFP. In other words, the confirmation screen may not be displayed at the second and subsequent start-up to enhance the user operability.

As illustrated in FIG. 11B, the communication setting screen 1150 displays various setting items including Bluetooth® Low Energy setting 1151.

The communication setting screen 1150 is used to make various communication settings of the MFP. By selecting one of the items displayed on the communication setting screen 1150, an advanced settings screen of the selected item is displayed.

The Bluetooth® Low Energy setting 1151 is displayed only when the optional wireless communication module 8 is connected. In other words, when the optional wireless communication module 8 is not connected, the Bluetooth® Low Energy setting 1151 is hidden. This is for the purpose of not confusing the user by not displaying unavailable items. Another display method may be employed, such as graying out, without hiding the Bluetooth® Low Energy setting 1151. The advanced settings screen may not be displayed even when the Bluetooth® Low Energy setting 1151 is selected.

Figure 12:
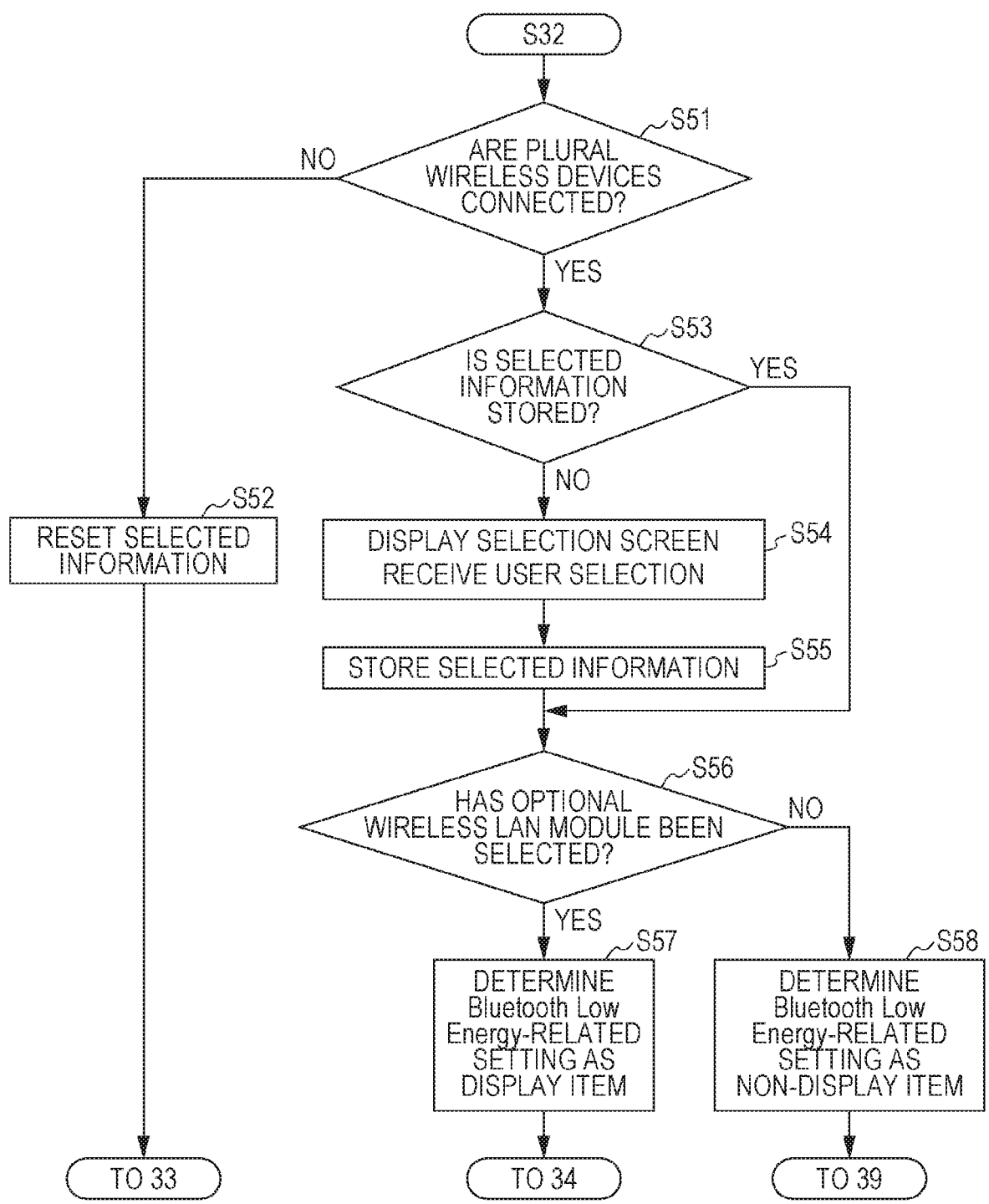
FIG. 12 is a diagram illustrating the control procedure of a fourth embodiment of the present disclosure.

Adding steps to the flowchart in FIG. 10 forms the flowchart in FIG. 12. FIG. 12 is a diagram illustrating the control procedure of the fourth embodiment.

As illustrated in FIG. 12, in the present embodiment, after the product IDs are read in S32, the process goes to S51.

In S51, the CPU 401 determines whether a plurality of wireless LAN devices are connected from the obtained product IDs. If a plurality of wireless LAN devices are connected (S51: YES), the CPU 401 advances the process to S53. If a plurality of wireless LAN devices are not connected (S51: NO), the CPU 401 advances the process to S52.

In S53, the CPU 401 determines whether selected information (described later) has been stored. If there is stored selected information (S53: YES), the CPU 401 advances the process to S56, and if there is no stored selected information (S53: NO), the CPU 401 advances the process to S54.

In S54, the confirmation screen 1100 is displayed on the display of the operating unit 3 to receive a user selection. The CPU 401 stores selected soft key 1101 or 1102 as selected information (S55) and advances the process to S56. The selected information is stored in a storage area in the RAM 402.

By a series of processes from S53 to S55, the confirmation screen 1100 is displayed only the first time that a plurality of wireless devices are connected. Thus, the confirmation screen 1100 is not displayed every time the MFP is started, so that the user is not troubled every time. In S52, the CPU 401 resets (deletes or erases) the selected information stored in S55 and advances the process to S33. This allows the process to go to S54 in the determination in S53. In other words, when the optional wireless communication module 8 is disconnected and connected so that a plurality of wireless devices are disconnected, and thereafter, a plurality of wireless devices are connected, the confirmation screen 1100 is displayed again. This allows the user to select a wireless LAN device again.

In S56, the CPU 401 determines which of the soft keys 1101 and 1102 the stored selected information indicates. In other words, the CPU 401 determines which of the standard wireless communication module 6 and the optional wireless communication module 8 is selected for use.

If the selected information indicates the soft key 1101, that is, the optional wireless communication module 8 is selected for use, the CPU 401 advances the process to S57.

If the selected information indicates the soft key 1102, that is, the standard wireless communication module 6 is selected for use, the CPU 401 advances the process to S58.

In S57, the CPU 401 designates the Bluetooth® Low Energy-related setting as a display item. This causes the Bluetooth® Low Energy setting 1151 to be displayed on the communication setting screen 1150. Thereafter, the CPU 401 advances the process to S34.

In S58, the CPU 401 designates the Bluetooth® Low Energy-related setting as a hidden item. This causes the Bluetooth® Low Energy setting 1151 to be hidden on the communication setting screen 1150. Thereafter, the CPU 401 advances the process to S39.

Also when the process advances from S52 to S33, whether to display or hide the Bluetooth® Low Energy-related setting is determined according to the kind of the wireless LAN device used (not illustrated in FIG. 12).

As described above, in the present embodiment, the confirmation screen 1100 is displayed. This prevents the MFP from being set to a wireless LAN setting not intended by the user.

In the present embodiment, selected information on wireless LAN selected by the user is stored. This prevents repeated display of the confirmation screen 1100, providing a high usability.

In the present embodiment, selected information on wireless LAN selected by the user is reset. This allows the user to make the wireless LAN setting again.

Other Embodiments

The present disclosure provides a program for implementing one or more functions of the above embodiments to a system or an apparatus via a network or a storage medium. The one or more functions of the above embodiments can also be implemented by one or more processors of the system or apparatus reading and executing the program. The one or more functions of the above embodiments can also be implemented by a circuit (for example, an application specific integrated circuit (ASIC)) for performing one or more functions.

According to the above embodiments, when an installation worker installs a combination module of wireless LAN and Bluetooth® Low Energy, there is no need to detach or stop a standard module only with a wireless LAN function. This reduces installation time and installation cost. Furthermore, there is no need for the installation worker to switch to a module to be operated, thereby preventing a setting error.

Some embodiments can also be realized by a computer of a system or apparatus that reads out and executes computer-executable instructions recorded on a storage medium (e.g., non-transitory computer-readable storage medium) to perform the functions of one or more of the above-described embodiment(s), and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-178930 filed Sep. 19, 2017 and No. 2018-121328 filed Jun. 26, 2018, which are hereby incorporated by reference herein in their entirety.

What is claimed is:

1. A communication apparatus connectable to a network using a first wireless LAN module, the communication apparatus comprising:
    an interface configured to connect a device and
    at least one controller configured to function as:
        a unit configured to start supplying power to a first wireless LAN module and supplying power to the device connected to the interface; and
        a unit configured to stop supplying power to the first wireless LAN module and load a driver corresponding to a second wireless LAN module upon acquisition of ID information related to the second wireless LAN module from the connected device subsequent to start of supplying power.

2. The communication apparatus according to claim 1, wherein
    the controller loads the driver corresponding to the second wireless LAN module without loading a driver corresponding to the first wireless LAN module based on the fact that the ID information related to the second wireless LAN module is acquired from the connected device.

3. The communication apparatus according to claim 1, wherein
    the controller downloads firmware corresponding to the second wireless LAN module without downloading firmware corresponding to the first wireless LAN module based on the fact the ID information related to the second wireless LAN module is acquired from the connected device.

4. The communication apparatus according to claim 1, further comprising:
    another interface for connecting the first wireless LAN module, wherein the other interface includes a switch for switching between power supply and shut-down to/from the first wireless LAN module.

5. The communication apparatus according to claim 1, wherein
    the second wireless LAN module includes an integrated circuit capable of providing a wireless LAN function and another wireless communication function.

6. The communication apparatus according to claim 1, wherein
    the second wireless LAN module includes a circuit that has a function for Bluetooth® Low Energy.

7. The communication apparatus according to claim 1, wherein the controller loads a driver corresponding to the first wireless LAN module without stopping supplying power to the first wireless LAN module upon acquisition of ID information different from the ID information related to the second wireless LAN module from the connected device subsequent to start of supplying power.

8. The communication apparatus according to claim 1, wherein the controller stops supplying power to the second wireless LAN module upon acquisition of ID information different from the ID information related to the second wireless LAN module from the connected device subsequent to start of supplying power.

9. The communication apparatus according to claim 1, further comprising a print device configured to form an image on a sheet.

10. The communication apparatus according to claim 9, wherein the controller causes the print device to form an image based on print data obtained via the second wireless LAN module.

11. The communication apparatus according to claim 1, further comprising a scan device configured to read an image from a document.

12. The communication apparatus according to claim 11, wherein the controller transmits an image obtained from the scan device via the second wireless LAN module.

13. The communication apparatus according to claim 1, wherein the first wireless LAN module is arranged on a first surface of side surfaces of the communication apparatus and the second wireless LAN module is arranged on a surface opposite to the first surface of the side surfaces of the communication apparatus.

14. The communication apparatus according to claim 1, wherein a member including a touch mark is arranged near the second wireless LAN module.

15. The communication apparatus according to claim 1, wherein the interface is a USB interface.

16. The communication apparatus according to claim 1, wherein the ID information is a product ID of a chip included in the second wireless LAN module.

17. A method for controlling a communication apparatus connectable to a network using a first wireless LAN module, the communication apparatus including an interface configured to connect a device, the method comprising:
    starting supplying power to the first wireless LAN module and supplying power to the device connected to the interface; and
    stopping the supplying power to the first wireless LAN module and loading a driver corresponding to a second wireless LAN module upon acquisition of ID information related to the second wireless LAN module from the device connected to the interface subsequent to starting the supplying power.

18. A non-transitory storage medium storing a program for causing a computer to execute a method for controlling a communication apparatus connectable to a network using a first wireless LAN module, the communication apparatus including an interface that can connect a device, the method comprising:
    starting supplying power to the first wireless LAN module and supplying power to the device connected to the interface; and
    stopping the supplying power to the first wireless LAN module and loading a driver corresponding to a second wireless LAN module upon acquisition of ID information related to the second wireless LAN module from the device connected to the interface subsequent to starting the supplying power.

* * * * *